United States Patent
Rodríguez Ramos et al.

(10) Patent No.: US 10,230,940 B2
(45) Date of Patent: Mar. 12, 2019

(54) METHOD FOR DETERMINING THE COMPLEX AMPLITUDE OF THE ELECTROMAGNETIC FIELD ASSOCIATED WITH A SCENE

(71) Applicant: Universidad de la Laguna, La Laguna (ES)

(72) Inventors: José Manuel Rodríguez Ramos, San Cristóbal de la Laguna (ES); Jonas Phillip Lüke, San Cristóbal de la Laguna (ES); Juan Manuel Trujillo Sevilla, Tacoronte (ES); Juan José Fernández Valdivia, La Laguna (ES)

(73) Assignee: Universidad de La Laguna (ES)

( * ) Notice: Subject to any disclaimer, the term of this patent is extended or adjusted under 35 U.S.C. 154(b) by 41 days.

(21) Appl. No.: 15/538,849

(22) PCT Filed: Dec. 21, 2015

(86) PCT No.: PCT/ES2015/070936
§ 371 (c)(1),
(2) Date: Jun. 22, 2017

(87) PCT Pub. No.: WO2016/102731
PCT Pub. Date: Jun. 30, 2016

(65) Prior Publication Data
US 2018/0007342 A1    Jan. 4, 2018

(30) Foreign Application Priority Data

Dec. 22, 2014 (ES) .................................. 201431900

(51) Int. Cl.
*H04N 13/207* (2018.01)
*G01J 11/00* (2006.01)
(Continued)

(52) U.S. Cl.
CPC ............ *H04N 13/207* (2018.05); *G01J 11/00* (2013.01); *G02B 27/22* (2013.01); *H04N 13/296* (2018.05)

(58) Field of Classification Search
CPC ..... H04N 13/207; H04N 13/296; G01J 11/00; G02B 27/22
(Continued)

(56) References Cited

U.S. PATENT DOCUMENTS

| 2010/0060962 A1* | 3/2010 | Rosen | G03H 1/0005 |
| | | | 359/29 |
| 2010/0142014 A1* | 6/2010 | Rosen | G03B 35/02 |
| | | | 359/1 |

FOREIGN PATENT DOCUMENTS

| CN | 102662238 A | 9/2012 |
| EP | 2372469 A1 | 10/2011 |

OTHER PUBLICATIONS

Park et al, "Light ray field capture using focal plane sweeping and its optical reconstruction using 3D displays", Optics Express, vol. 22, No. 21, 25444-25454, Oct. 2014.
(Continued)

*Primary Examiner* — Jefferey F Harold
*Assistant Examiner* — Omer Khalid
(74) *Attorney, Agent, or Firm* — Lerner, David, Littenberg, Krumholz & Mentlik, LLP

(57) ABSTRACT

A method for determining the complex amplitude of the electromagnetic field associated with a scene, comprising a) capturing a plurality of images of the scene by means of a photographic camera, the images being focused in planes of focus arranged at different distances, wherein the camera comprises a lens of focal length F and a sensor arranged at a certain distance from the lens in its image space, taking at least one image pair from the plurality of images and determining the accumulated wavefront to the conjugate plane in the object space corresponding to the intermediate plane with respect to the planes of focus of the two images of the pair.

18 Claims, 5 Drawing Sheets

(51) Int. Cl.
*G02B 27/22* (2018.01)
*H04N 13/296* (2018.01)

(58) Field of Classification Search
USPC .......................................................... 348/135
See application file for complete search history.

(56) References Cited

OTHER PUBLICATIONS

Orth et al., "Light field moment imaging, Optics letters", 38(15), 2666-2668, Jul. 22, 2013.

Van Dam et al., "Wave-front sensing from defocused images by use of wave-front slopes", Applied optics, 41(26), 5497-5502, Sep. 10, 2002.

International Search Report for PCT/ES2015/070936 dated Apr. 6, 2016.

Bingquan Chen et al, Reconstruction algorithm for diffraction tomography of diffuse photon density waves in a random medium, Pure and Applied Optics. Journal of the European Optical Society Part A, Institute of Physics Publishing, Bristol, GB, vol. 7, No. 5, Sep. 1, 1998 (Sep. 1, 1998), pp. 1161-1180.

Extended Search Report for PCT/ES2015/070936 dated Aug. 20, 2018, 5 pages.

* cited by examiner

METHOD FOR DETERMINING THE COMPLEX AMPLITUDE OF THE ELECTROMAGNETIC FIELD ASSOCIATED WITH A SCENE

CROSS-REFERENCE TO RELATED APPLICATIONS

The present application is a national phase entry under 35 U.S.C. § 371 of International Application No. PCT/ES2015/070936 filed Dec. 21, 2015, published in Spanish, which claims priority from Spanish Patent Application No. P201431900 filed Dec. 22, 2014, all of which are incorporated herein by reference.

OBJECT OF THE INVENTION

The present invention relates to a method for determining the complex amplitude of the electromagnetic field associated with a scene.

The method of the invention allows optical reconstruction of the scene in its entirety (modulus and phase of the electromagnetic field), which allows the subsequent use thereof in various applications, such as in obtaining the distance map of the scene, representation of the scene in 3D stereo mode or in 3D integral mode, representation of the scene that is completely focused, optically aberrated at will, or corrected for optical distortion (due to change in refractive index).

The invention can be applied in different technical fields, including computational photography and adaptive optics (astronomy, ophthalmology, microscopy, etc.).

BACKGROUND OF THE INVENTION

Up until now, in order to generate a three-dimensional (stereo or integral) image of a scene, the capture of the scene from various viewpoints has been used.

Orth (Orth, A., & Crozier, K. B. (2013), *Light field moment imaging*, Optics letters, 38(15), 2666-2668) generates a stereo (non-integral) image from two defocused images, using the light field moment imaging method, working in the transform domain.

Park (Park, J. H., Lee, S. K., Jo, N. Y., Kim, H. J., Kim, Y. S., & Lim, H. G. (2014), *Light ray field capture using focal plane sweeping and its optical reconstruction using 3D displays*, Optics Express, 22(21), 25444-25454) proposes a filtered backprojection algorithm applied to the light field such that a 3D stereo and integral image is created from defocused images of the scene. In this case, the defocused images (intensities) are sections at different angles of the light field in transform space. Acquiring few defocused images is the most suitable in low lighting scenarios. However, working in the transform domain with few defocused images causes blurring due to the absence of information in certain spatial frequencies.

The curvature sensor retrieves the wavefront phase in the pupil from two defocused images. The geometric sensor proposed by Van Dam and Lane (Van Dam, M. A., & Lane, R. G. (2002), *Wave-front sensing from defocused images by use of wave-front slopes*, Applied optics, 41(26), 5497-5502) also retrieves the wavefront phase in the pupil from two defocused images. However, the measurement of the wavefront phase in the pupil only allows correcting aberrations in the optical axis.

DESCRIPTION OF THE INVENTION

The preceding problems are solved by means of a method according to claim 1 and a device according to claim 10. The dependent claims define preferred embodiments of the invention.

A first aspect of the invention defines a method for determining the complex amplitude of the electromagnetic field associated with a scene, comprising the following steps:

a) capturing a plurality of images of the scene by means of a photographic camera, the images being focused in planes of focus arranged at different distances, wherein the camera comprises a lens of focal length F and a sensor arranged at a certain distance from the lens in its image space, b) taking at least one image pair from the plurality of images and determining the accumulated wavefront to the conjugate plane in the object space corresponding to the intermediate plane with respect to the planes of focus of the two images of the pair, determining the wavefront W(x,y) as:

$$W(x, y) = \sum_{p=0}^{N-1} d_p Z_p(x, y)$$

where $\{Z_p(x,y)\}$ is a predetermined set of polynomials and N is the number of polynomials used in the expansion, wherein the coefficients $d_j$ are determined by means of solving the system of equations:

$$\frac{u_{2X}(j) - u_{1X}(j)}{2z} = \left(\sum_{p=0}^{N-1} d_p \frac{\partial}{\partial x} Z_p(x, y)\right)\bigg|_{x=\frac{u_{1X}(j)+u_{2X}(j)}{2}, y=\frac{u_{1Y}(k)+u_{2Y}(k)}{2}}$$

$$\frac{u_{2Y}(k) - u_{1Y}(k)}{2z} = \left(\sum_{p=0}^{N-1} d_p \frac{\partial}{\partial y} Z_p(x, y)\right)\bigg|_{x=\frac{u_{1X}(j)+u_{2X}(j)}{2}, y=\frac{u_{1Y}(k)+u_{2Y}(k)}{2}}$$

where 2z is the distance between the planes of focus of the two images of the pair, where $\{(u_{1X}(j), u_{1Y}(k)), j,k=1 \ldots T\}$ are points belonging to the first image of the pair, and $\{(u_{2X}(j), u_{2Y}(k)), j,k=1 \ldots T\}$ are points belonging to the second image of the pair, such that for each $1 \leq j$, $k \leq T$, the following is verified $$\int_{-\infty}^{u_{1Y}(k)} \int_{-\infty}^{u_{1X}(j)} f_{1XY}(x,y) dx dy = s(j)s(k)$$

and $$\int_{-\infty}^{u_{2Y}(k)} \int_{-\infty}^{u_{2X}(j)} f_{2XY}(x,y) dx dy = s(j)s(k)$$

where s(j) is a sequence of real numbers of values between 0 and 1, monotonically increasing for each $1 \leq j \leq T$, where $f_{XY}$ is the two-dimensional density function which takes into account the probability of occurrence of a photon and is determined in each case by the normalized intensity I(x,y) of the corresponding image of the pair, i.e.:

$$\int_{-\infty}^{u_{1Y}(k)} \int_{-\infty}^{u_{1X}(j)} I_1(x,y) dx dy = s(j)s(k)$$

$$\int_{-\infty}^{u_{2Y}(k)} \int_{-\infty}^{u_{2X}(j)} I_2(x,y) dx dy = s(j)s(k).$$

The present invention allows generating not only a three-dimensional image from defocused images of the scene taken from a single viewpoint, but also the tomographic phase distribution of the scene. This means having the electromagnetic field contained in the scene in its entirety without using different viewpoints, as occurs in the plenoptic light field capture cameras, with the subsequent improvement in the final optical resolution obtained, which in the case of plenoptic cameras is limited by the diameter of the subapertures associated with each viewpoint.

In the context of the invention, it will be understood that a plurality of images is a number of images greater than or equal to two.

The photographic camera used to capture the images corresponds to a conventional optical system, and it includes a single lens, or system of lenses, working at a fixed or variable focal length (indistinctly), and a sensor arranged at a certain distance from the optical system in the image space.

The images captured by the camera are conjugate images in different planes. Each includes focused elements (those elements arranged in the plane of focus of the image) and defocused elements (those located in front of and behind the plane of focus).

According to the method of the invention, each image pair from the plurality of captured images allows determining the accumulated wavefront phase to the turbulence layer conjugated with the acquisition position following the classic rules of converging lenses. Therefore, by subtracting the contribution of each image pair obtained at different conjugate distances, the value of turbulence at that distance, in terms of phase imaging, of wavefront phase map is found. Therefore, when the plurality of images includes only two images, the method of the invention allows obtaining the wavefront in a single plane at a conjugate distance from the associated defocused image pair.

In a preferred embodiment, the two images of each selected image pair are taken, respectively, on both sides of the focus. In a preferred embodiment, the two images of each selected image pair are taken at symmetrical distances on both sides of the focus. However, the method of the invention is valid for any defocused image pair.

The method of the invention is a method of turbulence layer-oriented multi-conjugate tomography (Layer-oriented MCAO), based on using defocused images of large objects, instead of using conventional two-dimensional phase sensors such as the Shack-Hartmann or pyramid sensors.

The method of the present invention allows determining the complex amplitude of the electromagnetic field associated with a scene from the capture of defocused images thereof, even acquired in real time (less than 10 ms in the case of working in the visible range with atmospheric turbulence, 24 images per second in the case of video, etc.) with a single lens and a single viewpoint, without the camera used for the capture having a microlens array in the optical path.

In one embodiment, the wavefront is determined by the expression:

$$W(x, y) = \sum_{p=0}^{N-1}\sum_{q=0}^{N-1} d_{pq} Z_{pq}(x, y)$$

where $$Z_{pq}(x, y) = \frac{1}{N} e^{\frac{2\pi i}{N}(px+qy)}$$

for each $0 \leq p, q \leq N-1$.

Advantageously, in this embodiment the two-dimensional wavefront expanded as a function of complex exponentials is retrieved, which allows directly obtaining the Cartesian distribution of the wavefront phase horizontal and vertical slopes, and therefore the use of conventional slope integration methods, such as Hudgin or Fourier transform filtering.

In one embodiment, the accumulated wavefront is determined for a plurality of image pairs.

In one embodiment, the method additionally comprises determining the phase shift between two planes of the object space as the subtraction of the accumulated wavefronts to said planes that have been determined. Preferably, the phase shift is determined for a plurality of planes.

The present invention allows obtaining the electromagnetic field in its entirety (modulus and phase), not just the intensity thereof, by working with the defocused images in the measurement domain (not in the transform domain), together with a tomographic retrieval of the wavefront phase. Advantageously, the results of working in the measurement domain are defined much better than those of working in the transform domain, where the absence of information in certain spatial frequencies causes blurring when starting from few defocused images. Acquiring few defocused images is most suitable in low lighting scenarios.

Compared with methods from the state of the art that retrieve the wavefront phase only in the pupil, the present invention has the advantage of tomographically retrieving the wavefront phase that best fits the set of defocused images acquired from a scene. Tomographic measurement of the wavefront phase allows correcting aberrations in the entire field of view of the entrance pupil.

In one embodiment, the method additionally comprises determining, from P images selected from the plurality of captured images, the value of the light field (L) focused at distance F at M values other than u, M≤P, as the values of the light field verifying the system of equations:

$$\Sigma_{n=1}^{M} L_F(n+[(x-n)/a_j],n) = \alpha_j^2 F^2 I_j(x), \forall j \in \{1 \ldots P\} \wedge \forall x \in \{1 \ldots k\}$$

where P is the number of images considered for determining the light field, F is the focal length of the lens, $L_F$ is the value of the light field focused at distance F, $\alpha_j F$ is the focus distance of the image j and $I_j(x)$ is the intensity of the image j, and where [x] denotes the integer closest to x, obtaining as a result for each image j, with $1 \leq j \leq P$, the light field $L_F(x)$ evaluated at the value of $u_j$ resulting from the fit, i.e., the view of the light field corresponding to the value $u_j$, where x and u are the two-dimensional vectors determining the position in the sensor and in the lens of the camera, respectively.

Despite having described determining the light field in combination with the method for determining the wavefront phase according to the first aspect of the invention, the method of determining the light field can be carried out separately. Therefore, an additional aspect of the invention provides a method for determining the light field which comprises:

a) capturing a plurality of images of the scene by means of a photographic camera, the images being focused in planes of focus arranged at different distances, wherein the camera comprises a lens of focal length F and a sensor arranged a distance from the lens equal to its focal length, and b) determining, from P images selected from the plurality of captured images, the value of the light field (L) focused at distance F at M values other than u, M≤P, as the values of the light field verifying the system of equations:

$$\Sigma_{n=1}^{M} L_F(n+[(x-n)/a_j],n) = \alpha_j^2 F^2 I_j(x), \forall j \in \{1 \ldots P\} \wedge \forall x \in \{1 \ldots k\}$$

where P is the number of images considered for determining the light field, F is the focal length of the lens, $L_F$ is the value of the light field focused at distance F, $\alpha_j F$ is the focus distance of the image j and $I_j(x)$ is the intensity of the image j, and where [x] denotes the integer closest to x, obtaining as a result for each image j, with $1 \le j \le P$, the light field $L_F(x)$ evaluated at the value of $u_j$ resulting from the fit, i.e., the view of the light field corresponding to the value $u_j$, where x and u are the two-dimensional vectors determining the position in the sensor and in the lens of the camera, respectively.

In one embodiment, the value of the light field is determined by solving the system of equations by means of least squares, i.e., minimizing the expression:

$$\|\Sigma_{n=1}^{M} L_F(n+(x-n)/\alpha_j, n) - \alpha_j^2 F^2 I_j(x)\|_2.$$

In a second aspect, a device for determining the complex amplitude of the electromagnetic field associated with a scene is defined, comprising means for capturing images, comprising a lens of focal length F and an image sensor arranged parallel to the lens, at a certain distance from the lens in its image space, and processing means configured for carrying out step b) of the method according to the first aspect of the invention.

All the features and/or steps of methods described in this specification (including the claims, description and drawings) can be combined in any combination, with the exception of combinations of mutually exclusive features.

DESCRIPTION OF THE DRAWINGS

To complement the description made below and for the purpose of helping to better understand the features of the invention according to a preferred practical embodiment thereof, a set of drawings is enclosed as an integral part of said description in which the following is depicted in an illustrative and non-limiting manner.

PREFERRED EMBODIMENT OF THE INVENTION

Two-Dimensional Wavefront Reconstruction

Figure 1:
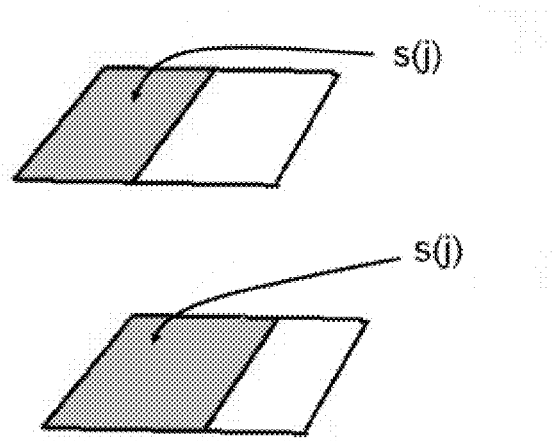
FIGS. 1 and 2 schematically depict part of the method of the invention.

The method of the invention allows retrieving, from two or more defocused images, the Cartesian distribution of the wavefront phase horizontal and vertical slopes in polynomial basis, which in turn allows using any method for phase recomposition from slopes, whether they are zonal methods (Hudgin, etc.) or modal methods. In the case of modal methods, the set of polynomials on which the wavefront phase map is expanded and fitted can be chosen according to the need of the problem: Zernike polynomials (coincide with the classic optical or Seidel aberrations), complex exponentials (contain the Fourier transform kernel, the use of which accelerates computation), Karhunen-Löeve function (without any analytical form but constituting a basis in annular pupils, which are typical in telescopes), etc.

In general, the method for restoring the phase map from the expansion thereof in a set of polynomials $Z_j(x,y)$ comprises considering the wavefront phase at a point (x,y) as follows:

$$W(x,y) = \Sigma_{j=0}^{N-1} d_j Z_j(x,y) \tag{1}$$

where N indicates the number of polynomials used in the expansion.

The horizontal and vertical Cartesian slopes, $S^x$ and $S^y$ respectively, correspond to the following partial derivatives of the wavefront:

$$S^x = \frac{\partial}{\partial x} W(x, y) = \sum_{j=0}^{N-1} d_j \frac{\partial}{\partial x} Z_j(x, y) \tag{2}$$

$$S^y = \frac{\partial}{\partial y} W(x, y) = \sum_{j=0}^{N-1} d_j \frac{\partial}{\partial y} Z_j(x, y) \tag{3}$$

A photon is assumed to displace from a plane −z to a plane +z, and the wavefront at points (x, y) of the intermediate plane is estimated.

The propagated wavefront intensity is represented by a two-dimensional density function (PDF) for taking into account the probability of occurrence of a photon (denoted as $f_{XY}(x, y)$), through the corresponding two-dimensional cumulative distribution function (CDF) (denoted as C(x, y)).

The density function verifies:

$$\int_{-\infty}^{+\infty} \int_{-\infty}^{+\infty} f_{XY}(x,y) dx dy = 1$$

The marginal cumulative distribution function in the variable x is constructed as:

$$C_X(x) = \int_{-\infty}^{x} f_X(s) ds$$

where $f_X$ is a marginal density function constructed from the density function ($f_{XY}$) as follows:

$$f_X(x) = \int_{-\infty}^{+\infty} f_{XY}(x,y) dy$$

The property of being a cumulative distribution function in the corresponding variable is conserved for the marginal density function. Therefore, $$\int_{-\infty}^{+\infty} f_X(x) dx = 1$$

Since there is data in planes −z and +z, corresponding to the two images considered, there are two cumulative distribution functions. The marginal cumulative distribution function in plane −z is denoted as $C_{1X}$, and the marginal cumulative distribution function in plane +z is denoted as $C_{2X}$.

Given that the method starts from the values of $f_{XY}$ in planes −z and +z, it is assumed that the data associated with plane −z is defined by $f_{1XY}$ and the data associated with plane +z is determined by $f_{2XY}$:

$$f_{1X}(x) = \int_{-\infty}^{+\infty} f_{1XY}(x,y) dy,$$

$$f_{2X}(x) = \int_{-\infty}^{+\infty} f_{2XY}(x,y) dy,$$

and $$C_{1X}(x) = \int_{-\infty}^{x} f_{1X}(s) ds,$$

$$C_{2X}(x) = \int_{-\infty}^{x} f_{2X}(s) ds,$$

A monotonically increasing sequence of real numbers (s(j)) is considered with $1 \le j \le T$, of values between 0 and 1, i.e., $0 \le s(j) \le 1$ for each $1 \le j \le T$.

Histogram matching in the marginal cumulative distribution function is performed, to find the mirror image of the values of the cumulative distribution function of the values of s(j). In other words, the value $u_{1X}(j)$ that meets the following is sought:

$$C_{1X}(u_{1X}(j))=s(j)$$

for each $1 \leq j \leq T$, and the value $u_{2X}(j)$ that meets the following:

$$C_{2X}(u_{2X}(j))=s(j)$$

Therefore, $u_{1X}(j)$ and $u_{2X}(j)$ have been found for each fixed value of s(j). Graphically speaking, a search is conducted with an x-axis scan of corresponding points, identifying all the ordinates, as schematically depicted in FIG. 1.

What provides more accurate values is to now go from the density function in the two variables for each of these values, to find, for each value k from 1 to T, the values $u_{1Y}(k)$ and $u_{2Y}(k)$ that meet the following:

$$\int_{-\infty}^{u_{1Y}(k)} \int_{-\infty}^{u_{1X}(j)} f_{1XY}(x,y)dxdy = s(j)s(m)$$

and $$\int_{-\infty}^{u_{2Y}(k)} \int_{-\infty}^{u_{2X}(j)} f_{2XY}(x,y)dxdy = s(j)s(m)$$

where the functions $f_{1XY}(x,y)$ and $f_{2XY}(x,y)$ correspond to the images considered $I_1(x,y)$ and $I_2(x,y)$, respectively.

Figure 2:
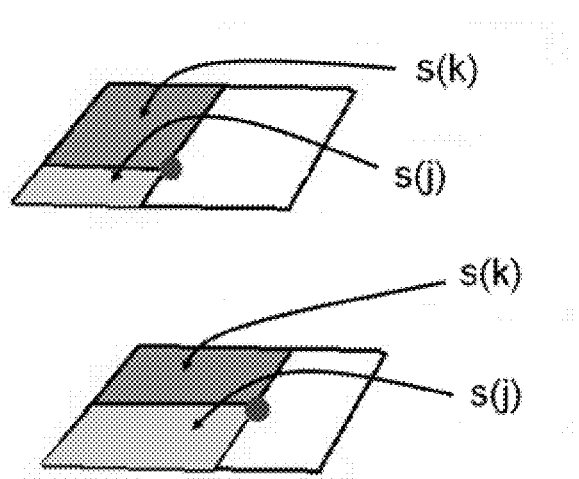

Graphically, what is done is to associate each corresponding value on the x-axis with the ordinate that makes the mirror images through the cumulative distribution function match up, as schematically depicted in FIG. 2.

The result is a two-dimensional mesh of points determined by $$\{(u_{1X}(j), u_{1Y}(k)), j, k=1 \ldots T\} \text{ at height } -z, \text{ and}$$

$$\{(u_{2X}(j), u_{2Y}(k)), j, k=1 \ldots T\} \text{ at height } +z,$$

such that for each $1 \leq j$, $k \leq T$, the points $(u_{1X}(j), u_{1Y}(k))$ and $(u_{2X}(j), u_{2Y}(k))$ are associated with the same value of a ray in the wavefront.

The directional derivatives of the wavefront in the points of the intermediate plane can be considered determined by the expressions:

$$W_x\left(\frac{u_{1X}(j)+u_{2X}(j)}{2}, \frac{u_{1Y}(k)+u_{2Y}(k)}{2}\right) = \frac{u_{2X}(j)-u_{1X}(j)}{2z}, \quad (4)$$

for each $1 \leq j \leq T$, and $$W_y\left(\frac{u_{1X}(j)+u_{2X}(j)}{2}, \frac{u_{1Y}(k)+u_{2Y}(k)}{2}\right) = \frac{u_{2Y}(k)-u_{1Y}(k)}{2z}, \quad (5)$$

for each $1 \leq k \leq T$.

Therefore, the system of equations (2) and (3) can be written as:

$$\frac{u_{2X}(j)-u_{1X}(j)}{2z} = \left(\sum_{p=0}^{N-1} d_p \frac{\partial}{\partial x} Z_p(x,y)\right)\bigg|_{x=\frac{u_{1X}(j)+u_{2X}(j)}{2}, y=\frac{u_{1Y}(k)+u_{2Y}(k)}{2}}$$

$$\frac{u_{2Y}(k)-u_{1Y}(k)}{2z} = \left(\sum_{p=0}^{N-1} d_p \frac{\partial}{\partial x} Z_p(x,y)\right)\bigg|_{x=\frac{u_{1X}(j)+u_{2X}(j)}{2}, y=\frac{u_{1Y}(k)+u_{2Y}(k)}{2}}$$

or in a simplified form:

$$S = A \cdot d \quad (6)$$

where the unknown is the matrix of coefficients d. Equation (6) represents an overdetermined system of equations where there are more equations ($2T^2$) than unknowns (N), where $2T^2$ is the number of pixels (x,y) that are available.

The coefficients d of the expansion can be found as the best fit on the plane in the sense of least squares. A preferred way to solve the preceding system is to solve by means of the least squares as:

$$d = (A^T A)^{-1} A^T S = S^+ S \quad (7)$$

Equation (7) can be solved by a number of techniques known by the person skilled in the art, depending on whether or not the matrix $A^T A$ is singular.

In a particular embodiment, the wavefront is expanded as a function of complex exponentials. Expansion is truncated in a certain $N \geq 1$ such that it can be written as $$W(x,y) = \sum_{p=0}^{N-1} \sum_{q=0}^{N-1} d_{pq} Z_{pq}(x,y)$$

where $(d_{pq})_{p,q \geq 0}$ is a doubly indexed family of coefficients, and where $$Z_{pq}(x,y) = \frac{1}{N} e^{\frac{2\pi i}{N}(px+qy)} \quad (8)$$

for each $0 \leq p, q \leq N-1$.

At this point a problem of least squares can be solved with the obtained data because by deriving with respect to x or y, the following is deduced from expression (8)

$$\frac{\partial}{\partial x} W(x,y) = \sum_{p=0}^{N-1} \sum_{q=0}^{N-1} d_{pq} \frac{\partial}{\partial x} Z_{pq}(x,y), \quad (9)$$

$$\frac{\partial}{\partial y} W(x,y) = \sum_{p=0}^{N-1} \sum_{q=0}^{N-1} d_{pq} \frac{\partial}{\partial y} Z_{pq}(x,y), \quad (10)$$

Therefore, for each $0 \leq p, q \leq N-1$:

$$\frac{\partial}{\partial x} Z_{pq}(x,y) = Z_{pq} \frac{2\pi i p}{N},$$

$$\frac{\partial}{\partial y} Z_{pq}(x,y) = Z_{pq} \frac{2\pi i q}{N}.$$

By evaluating at the midpoints, taking into account expressions (4) and (5) and replacing these values in equations (9) and (10), it is possible to arrive at the following overdetermined system:

$$\frac{u_{2X}(j)-u_{1X}(j)}{2z} = \sum_{p=0}^{N-1} \sum_{q=0}^{N-1} d_{pq} \frac{2\pi i p}{N} Z_{pq}\left(\frac{u_{1X}(j)+u_{2X}(j)}{2}, \frac{u_{1Y}(k)+u_{2Y}(k)}{2}\right)$$

$$\frac{u_{2Y}(k)-u_{1Y}(k)}{2z} = \sum_{p=0}^{N-1} \sum_{q=0}^{N-1} d_{pq} \frac{2\pi i q}{N} Z_{pq}\left(\frac{u_{1X}(j)+u_{2X}(j)}{2}, \frac{u_{1Y}(k)+u_{2Y}(k)}{2}\right)$$

with $N^2$ unknowns and $2T^2$ equations. The value of T is determined by the data, which is considered to be much greater than the number of addends in the expansion of the phase in terms of exponentials.

In this case, the coefficients of the expansion can be obtained from the expression:

$$d_{pq} = \frac{-2[i\sin(\pi p/N)DF\{S^x\} + i\sin(\pi q/N)DF\{S^y\}]}{4[\sin^2(\pi p/N) + \sin^2(\pi q/N)]}$$

where DF denotes the discrete Fourier transform.

Tomographic Restoration of the Image

The method of the invention provides a two-dimensional restoration of the wavefront phase from the defocused images. The obtained wavefront phase corresponds to the accumulated phase differences to the conjugate position in the object space. In other words, if two defocused images are taken that are so far away from the focus of the lens that they almost correspond with images taken in the pupil (or with very little separation from the entrance pupil of the optical system), the phase accumulated in the entire field of view of the scene to the arrival to the objective would be obtained. As the defocused image pair used approaches the focus, the conjugate plane in the object space will correspond to a plane farther away from the entrance pupil, and it will describe the phase accumulated in the scene to that plane.

Figure 6:
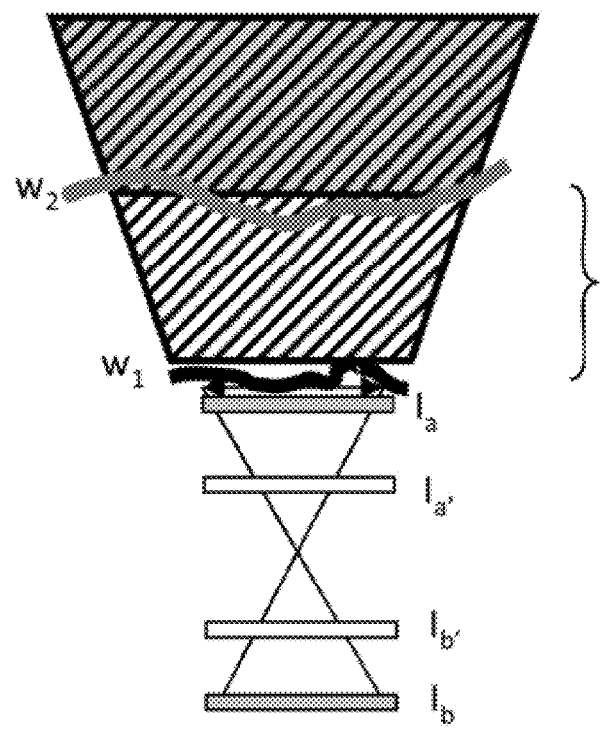
FIG. 6 schematically depicts obtaining the wavefront phase corresponding to different planes.

The difference between both accumulated phases provides the phase shift present between the farthest plane and the pupil plane of the optical system. Therefore, the greater the number of defocused images used, the more complete the discretization of the object space and the obtained tomographic distribution of the wavefront phase will be. This tomographic distribution of the wavefront phase will have the original two-dimensional optical resolution associated with the capture sensor and the three-dimensional resolution (in optical axis z) that the number of images used allows. It should be pointed out that the three-dimensional resolution does not strictly coincide with the number of planes or defocused images acquired, as it is possible to consider any pair of acquisition planes for obtaining sub-discretization of accumulated wavefront phases, as schematically depicted in FIG. 6.

With planes $I_a$ and $I_b$, the accumulated phase $W_1(x,y)$ to the pupil is found. With $I_{a'}$ and $I_{b'}$, the accumulated phase $W_2(x,y)$ is found. The difference between $W_2$ and $W_1$ provides the phase in the section indicated by the key. By using more planes (more captured images), resolution in axis z of the phase is increased, and a three-dimensional map of the wavefront phase is obtained.

The method of the present invention can be applied in any technical field in which the wavefront associated with the observation of a scene is to be known, including computational photography and adaptive optics, particularly in applications relating to astronomical observations to obtain a three-dimensional map of turbulences (wavefront phases) associated with a column of the atmosphere, in applications in which it is necessary to correct the view through turbulent media (for example in augmented reality glasses, mobiles, microscopes, or endoscopes), in applications for the tomographic measurement of variations in refractive index in transparent organic tissue samples or in applications of optic communications through turbulent media (atmosphere, ocean, body fluids, etc.).

Image Intensity Recomposition

Figure 3:
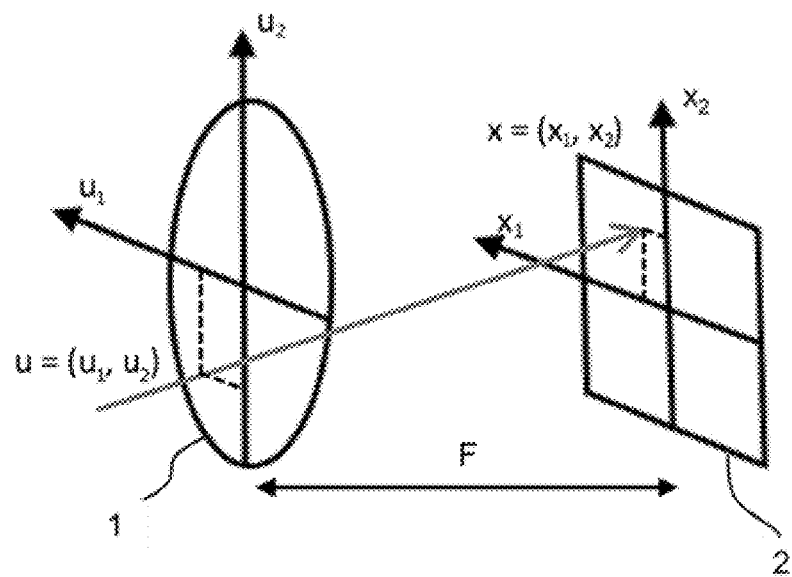
FIG. 3 schematically depicts the light field between the lens and the sensor of a camera.

The light field L is a four-dimensional representation of the light rays going through the objective of a camera. For the sake of simplicity, a simplified two-dimensional notation will be used. Therefore, $L_F(x,u)$ represents the ray going through the main lens of the camera in position $u=(u_1, u_2)$ and arriving at the sensor in position $x=(x_1, x_2)$ for a camera of focal length F, as depicted in FIG. 3.

Figure 4:
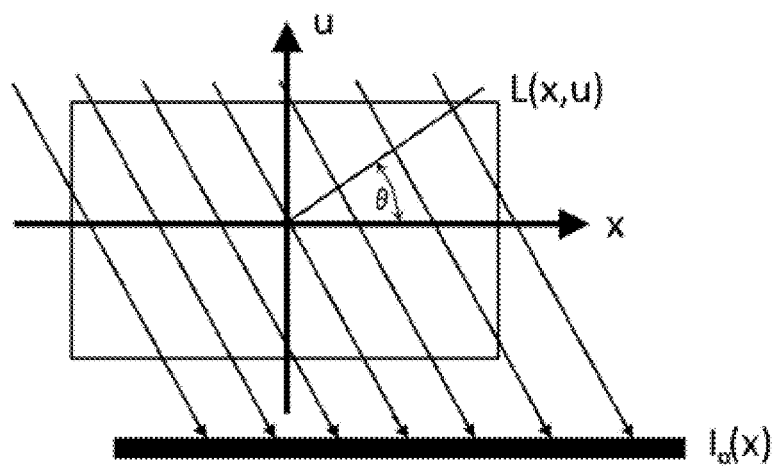
FIGS. 4 and 5 schematically exemplify a part of the method of the invention.

Therefore, there is a four-dimensional volume representing all the rays entering the camera and their positions of arrival to the sensor. Ng (Ng, R., *Fourier slice photography*, in ACM Transactions on Graphics (TOG), Vol. 24, No. 3, pp. 735-744, ACM, 2005, July) demonstrates that the image that would be projected onto the sensor if said sensor were at distance $\alpha F$, would correspond to a two-dimensional projection of the light field at angle $\theta = \tan^{-1}(1/\alpha)$:

$$I_\alpha(x) = \frac{1}{\alpha^2 F^2} \int L_F\left(u + \frac{x-u}{\alpha}, u\right) du,$$

as schematically depicted in FIG. 4.

Figure 5:
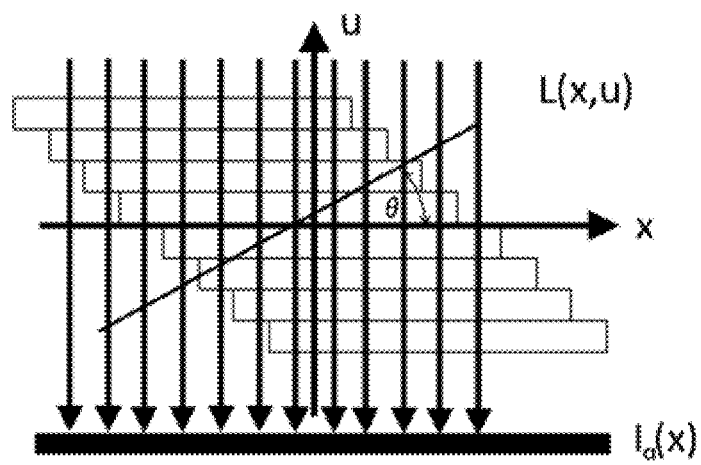

The method of the invention is based on interpreting $I_\alpha(x)$ as a sum of images at different values u displaced with respect to one another, as schematically depicted in FIG. 5, and on estimating images at different values u, finding which set of images that are displaced due to a value $\alpha'$ and added to one another best approximates the input image captured with a focus distance $F\alpha'$. Displacement in the x dimension (in pixels) is therefore $u+(x-u)/\alpha'$.

The method comprises estimating the value of the light field focused at distance F ($L_F$) at M values other than u from P images ($I_1(x), I_2(x) \ldots I_P(x)$) focused at distances $\alpha_1 F, \alpha_2 F \ldots \alpha_P F$ and captured with a conventional photographic camera. To that end, the method seeks to find the values of the light field such that the following is met:

$$\sum_{n=1}^{M} L_F(n + [(x-n)/\alpha_j], n) = \alpha_j^2 F^2 I_j(x),$$

$$\forall j \in \{1 \ldots P\} \wedge \forall x \in \{1 \ldots k\}$$

The preceding expression can be simply represented by a linear system of equations of type Ax=b. This system can be solved by finding for x such that it minimizes $\|Ax-b\|^2$.

Up until now single channel images have been assumed. In the case of color images (having multiple channels), generating the matrix A once is enough. Then a new vector b containing the information about the images in the channel to be solved is created.

The method for recomposing the intensity of the image according to the invention allows generating a single image that is completely focused and with complete optical resolution (all-in-focus), generating the all-in-focus stereo pair, generating an all-in-focus multi-stereo image (light field) and generating a light field focused at will where desired, with applications in microscopy, photography, endoscopy, cinematography, etc.

Example

Assume two images of 8 elements, $I_1(x)$ and $I_2(x)$, focused at distances $\alpha_1=2$ and $\alpha_2=4$, with F=1 m. The summation in this case is with indices from n=1 to n=2.

The equations for j=1 are:

$$L_F\left(1+\left[\frac{8-1}{2}\right],1\right)+L_F\left(2+\left[\frac{8-2}{2}\right],2\right)=2^2 I_1 \quad (1)$$

$$L_F\left(1+\left[\frac{1-1}{2}\right],1\right)+L_F\left(2+\left[\frac{1-2}{2}\right],2\right)=2^2 I_1 \quad (2)$$

$$L_F\left(1+\left[\frac{2-1}{2}\right],1\right)+L_F\left(2+\left[\frac{2-2}{2}\right],2\right)=2^2 I_1 \quad (3)$$

$$L_F\left(1+\left[\frac{3-1}{2}\right],1\right)+L_F\left(2+\left[\frac{3-2}{2}\right],2\right)=2^2 I_1$$

$$\vdots$$

$$L_F\left(1+\left[\frac{8-1}{2}\right],1\right)+L_F\left(2+\left[\frac{8-2}{2}\right],2\right)=2^2 I_1 \quad (8)$$

and for j=2

$$L_F\left(1+\left[\frac{1-1}{4}\right],1\right)+L_F\left(2+\left[\frac{1-2}{4}\right],2\right)=4^2 I_2 \quad (1)$$

$$L_F\left(1+\left[\frac{2-1}{4}\right],1\right)+L_F\left(2+\left[\frac{2-2}{4}\right],2\right)=4^2 I_2 \quad (2)$$

$$L_F\left(1+\left[\frac{3-1}{4}\right],1\right)+L_F\left(2+\left[\frac{3-2}{4}\right],2\right)=4^2 I_2 \quad (3)$$

$$\vdots$$

$$L_F\left(1+\left[\frac{8-1}{4}\right],1\right)+L_F\left(2+\left[\frac{8-2}{4}\right],2\right)=4^2 I_2 \quad (8)$$

Expanding:

$L_F(1,1)+L_F(2,2)=2^2 I_1$ (1)

$L_F(2,1)+L_F(2,2)=2^2 I_1$ (2)

$L_F(2,1)+L_F(3,2)=2^2 I_1$ (3)

$L_F(3,1)+L_F(3,2)=2^2 I_1$ (4)

$L_F(3,1)+L_F(4,2)=2^2 I_1$ (5)

$L_F(4,1)+L_F(4,2)=2^2 I_1$ (6)

$L_F(4,1)+L_F(5,2)=2^2 I_1$ (7)

$L_F(5,1)+L_F(5,2)=2^2 I_1$ (8)

$L_F(1,1)+L_F(2,2)=4^2 I_2$ (1)

$L_F(1,1)+L_F(2,2)=4^2 I_2$ (2)

$L_F(2,1)+L_F(2,2)=4^2 I_2$ (3)

$L_F(2,1)+L_F(3,2)=4^2 I_2$ (4)

$L_F(2,1)+L_F(3,2)=4^2 I_2$ (5)

$L_F(2,1)+L_F(3,2)=4^2 I_2$ (6)

$L_F(3,1)+L_F(3,2)=4^2 I_2$ (7)

$L_F(3,1)+L_F(4,2)=4^2 I_2$ (8)

In matrix form:

$$\begin{bmatrix} 1 & 0 & 0 & 0 & 0 & 0 & 0 & 0 & 0 & 1 & 0 & 0 & 0 & 0 & 0 & 0 \\ 0 & 1 & 0 & 0 & 0 & 0 & 0 & 0 & 0 & 1 & 0 & 0 & 0 & 0 & 0 & 0 \\ 0 & 1 & 0 & 0 & 0 & 0 & 0 & 0 & 0 & 0 & 1 & 0 & 0 & 0 & 0 & 0 \\ 0 & 0 & 1 & 0 & 0 & 0 & 0 & 0 & 0 & 0 & 1 & 0 & 0 & 0 & 0 & 0 \\ 0 & 0 & 1 & 0 & 0 & 0 & 0 & 0 & 0 & 0 & 0 & 1 & 0 & 0 & 0 & 0 \\ 0 & 0 & 0 & 1 & 0 & 0 & 0 & 0 & 0 & 0 & 0 & 1 & 0 & 0 & 0 & 0 \\ 0 & 0 & 0 & 1 & 0 & 0 & 0 & 0 & 0 & 0 & 0 & 0 & 1 & 0 & 0 & 0 \\ 0 & 0 & 0 & 0 & 1 & 0 & 0 & 0 & 0 & 0 & 0 & 0 & 1 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 1 & 0 & 0 & 0 & 0 & 0 & 0 & 1 & 0 & 0 & 0 & 0 & 0 & 0 & 0 \\ 1 & 1 & 0 & 0 & 0 & 0 & 0 & 0 & 0 & 1 & 0 & 0 & 0 & 0 & 0 & 0 \\ 1 & 1 & 0 & 0 & 0 & 0 & 0 & 0 & 0 & 1 & 0 & 0 & 0 & 0 & 0 & 0 \\ 0 & 1 & 0 & 0 & 0 & 0 & 0 & 0 & 0 & 1 & 0 & 0 & 0 & 0 & 0 & 0 \\ 0 & 0 & 1 & 0 & 0 & 0 & 0 & 0 & 0 & 1 & 0 & 0 & 0 & 0 & 0 & 0 \\ 0 & 0 & 1 & 0 & 0 & 0 & 0 & 0 & 0 & 0 & 1 & 0 & 0 & 0 & 0 & 0 \end{bmatrix}$$

$$\begin{bmatrix} L_F(1,1) \\ L_F(2,1) \\ L_F(3,1) \\ L_F(4,1) \\ L_F(5,1) \\ L_F(6,1) \\ L_F(7,1) \\ L_F(8,1) \\ L_F(1,2) \\ L_F(2,2) \\ L_F(3,2) \\ L_F(4,2) \\ L_F(5,2) \\ L_F(6,2) \\ L_F(7,2) \\ L_F(8,2) \end{bmatrix} = \begin{bmatrix} 2^2 I_1(1) \\ 2^2 I_1(2) \\ 2^2 I_1(3) \\ 2^2 I_1(4) \\ 2^2 I_1(5) \\ 2^2 I_1(6) \\ 2^2 I_1(7) \\ 2^2 I_1(8) \\ 4^2 I_2(1) \\ 4^2 I_2(2) \\ 4^2 I_2(3) \\ 4^2 I_2(4) \\ 4^2 I_2(5) \\ 4^2 I_2(6) \\ 4^2 I_2(7) \\ 4^2 I_2(8) \end{bmatrix}$$

The resolution of the preceding system provides the values of the light field $L_F$. The values of the light field that are not defined in any equation in the preceding system take the value 0.

Figure 7:
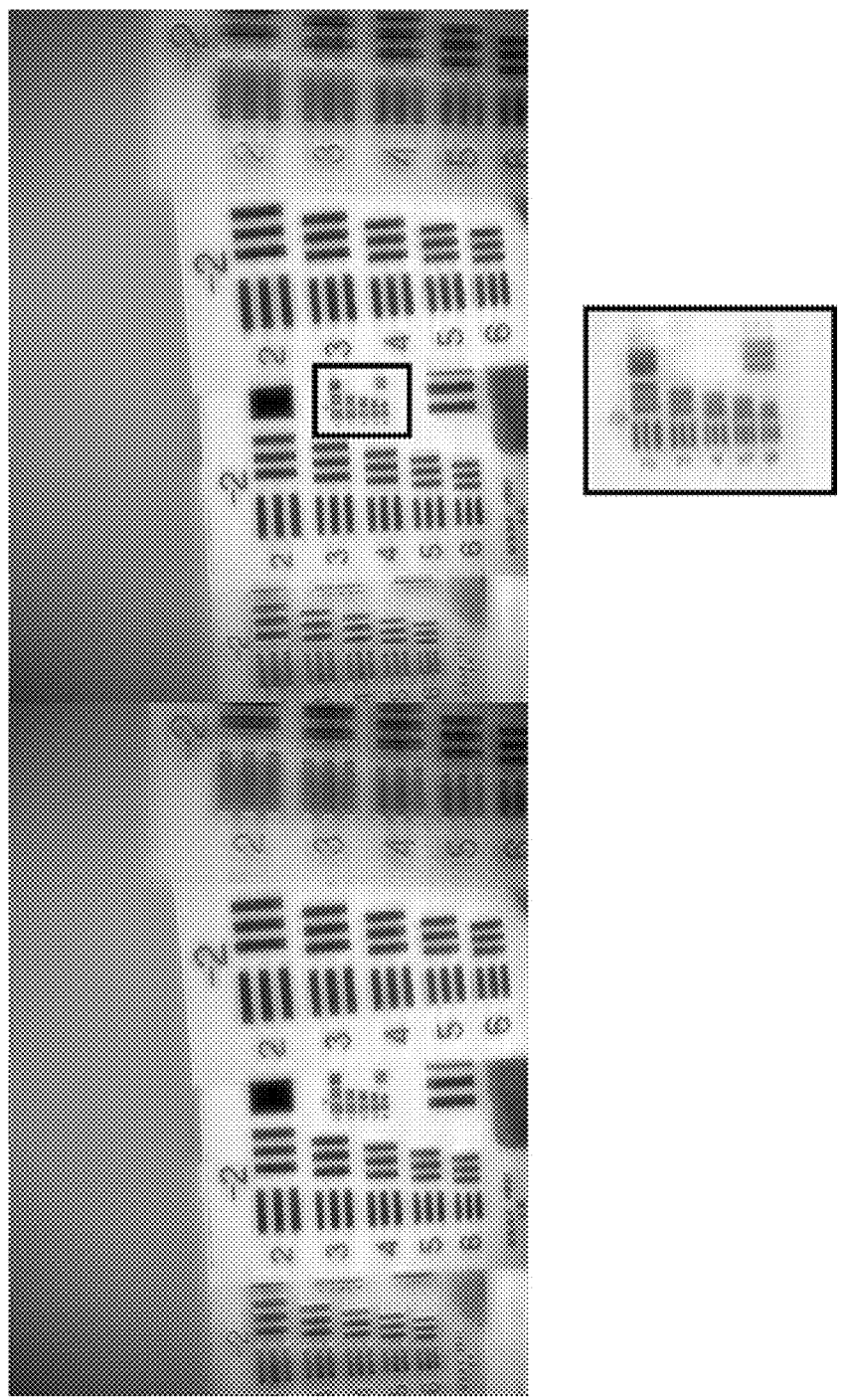
FIGS. 7 and 8 show image recompositions in transform domain and in measurement domain, respectively.
Figure 8:
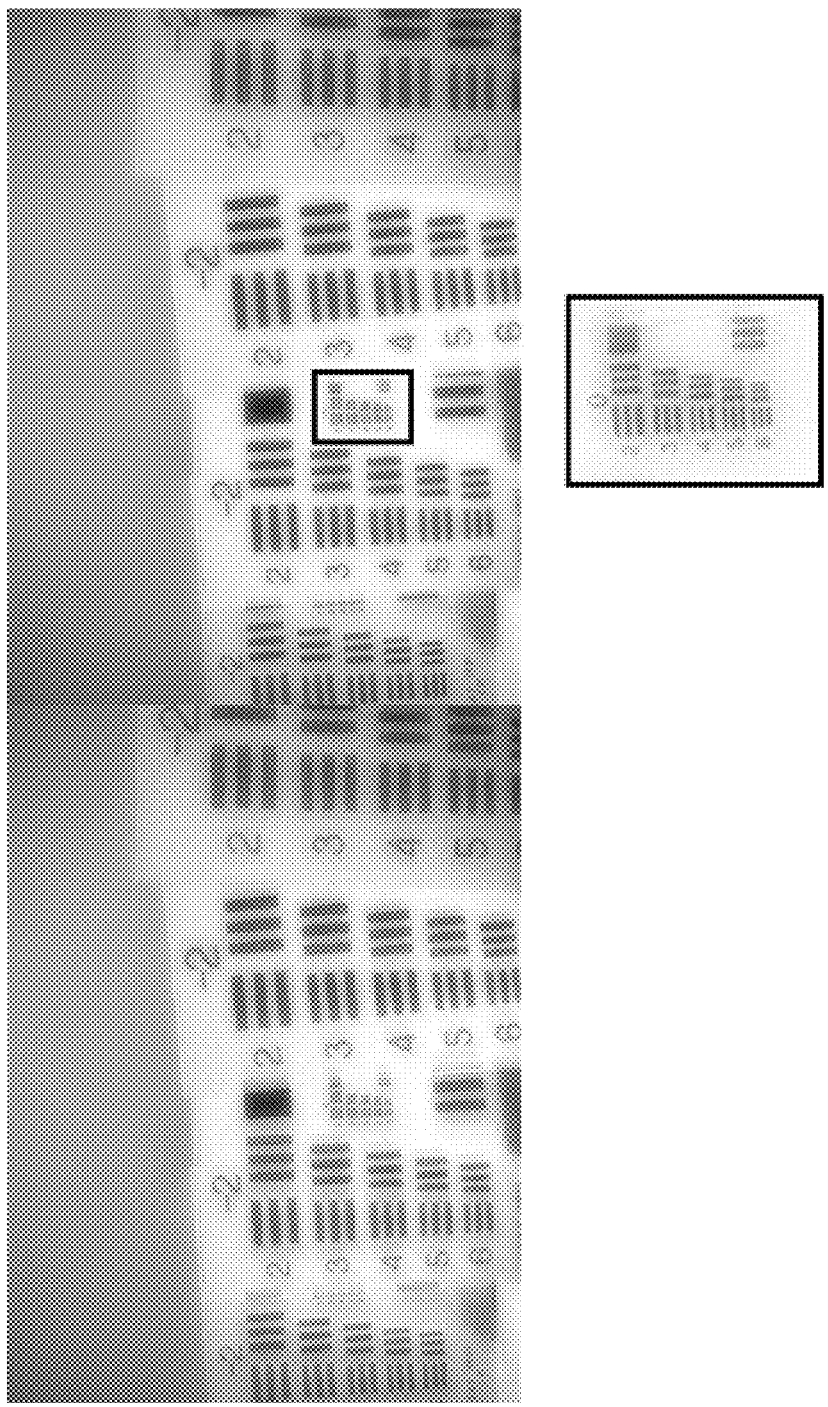

FIG. 7 shows the image recomposition of a scene performed in transform domain, according to a method from the state of the art. FIG. 8 shows the image recomposition of the same scene performed in measurement domain, using the method of the present invention for obtaining the light field from defocused images. Although the images of FIGS. 7 and 8 are not normalized to the same signal strength value, it can be seen that the recomposition performed in the measurement domain is better defined and sharper at the edges of the resolution test figures. The area marked in the box and enlarged so it can be seen better perfectly illustrates the difference in quality between both retrievals.

The invention claimed is:

1. A method for determining the complex amplitude of the electromagnetic field associated with a scene, comprising:
   a) capturing a plurality of images of the scene by a photographic camera, the images being focused in planes of focus arranged at different distances, wherein the camera comprises a lens or system of lenses of focal length F and a sensor arranged at a certain distance from the lens in the image space,
   b) taking at least one image pair from the plurality of images and determining the accumulated wavefront to a conjugate plane in an object space corresponding to an intermediate plane with respect to the planes of focus of the two images of the pair, determining the wavefront W(x,y) as:

$$W(x, y) = \sum_{p=0}^{N-1} d_p Z_p(x, y)$$

where $\{Z_p(x,y)\}$ is a predetermined set of polynomials and N is the number of polynomials used in the expansion,
wherein the coefficients $d_j$ are determined by means of solving the system of equations:

$$\frac{u_{2X}(j) - u_{1X}(j)}{2z} = \left(\sum_{p=0}^{N-1} d_p \frac{\partial}{\partial x} Z_p(x, y)\right)\bigg|_{x=\frac{u_{1X}(j)+u_{2X}(j)}{2}, y=\frac{u_{1Y}(k)+u_{2Y}(k)}{2}}$$

$$\frac{u_{2Y}(k) - u_{1Y}(k)}{2z} = \left(\sum_{p=0}^{N-1} d_p \frac{\partial}{\partial x} Z_p(x, y)\right)\bigg|_{x=\frac{u_{1X}(j)+u_{2X}(j)}{2}, y=\frac{u_{1Y}(k)+u_{2Y}(k)}{2}}$$

where 2z is the distance between the planes of focus of the two images of the pair, where $\{(u_{1X}(j), u_{1Y}(k)), j,k=1 \ldots T\}$ are points belonging to the first image of the pair, and $\{(u_{2X}(j), u_{2Y}(k)), j,k=1 \ldots T\}$ are points belonging to the second image of the pair, such that for each $1 \leq j$, $k \leq T$, the following is verified $$\int_{-\infty}^{u_{1Y}(k)} \int_{-\infty}^{u_{1X}(j)} f_{1XY}(x,y)dxdy = s(j)s(k)$$

and $$\int_{-\infty}^{u_{2Y}(k)} \int_{-\infty}^{u_{2X}(j)} f_{2XY}(x,y)dxdy = s(j)s(k)$$

where s(j) is a sequence of real numbers of values between 0 and 1, monotonically increasing for each $1 \leq j \leq T$,
where $f_{XY}$ is the two-dimensional density function which takes into account the probability of occurrence of a photon and is determined in each case by the normalized intensity I(x,y) of the corresponding image of the pair, i.e.:

$$\int_{-\infty}^{u_{1Y}(k)} \int_{-\infty}^{u_{1X}(j)} I_1(x,y)dxdy = s(j)s(k)$$

$$\int_{-\infty}^{u_{2Y}(k)} \int_{-\infty}^{u_{2X}(j)} I_2(x,y)dxdy = s(j)s(k).$$

2. The method according to claim 1, wherein the wavefront is determined by the expression:

$$W(x, y) = \sum_{p=0}^{N-1}\sum_{q=0}^{N-1} d_{pq} Z_{pq}(x, y)$$

where $$Z_{pq}(x, y) = \frac{1}{N} e^{\frac{2\pi i}{N}(px+qy)}$$

for each $0 \leq p, q \leq N-1$.

3. The method according to claim 1, further comprising determining the accumulated wavefront for a plurality of image pairs.

4. The method according to claim 3, further comprising determining a phase shift between two planes of the object space as the subtraction of the accumulated wavefronts to said planes.

5. The method according to claim 4, further comprising determining the phase shift for a plurality of object planes.

6. The method according to claim 1, further comprising:
   determining, from P images selected from the plurality of captured images, a value of a light field (L) focused at distance F at M values other than u, M≤P, as the values of the light field verifying the system of equations:

$$\Sigma_{n=1}^{M} L_F(n+[(x-n)/a_j],n) = \alpha_j^2 F^2 I_j(x), \forall j \in \{1 \ldots P\} \wedge \forall x \in \{1 \ldots k\}$$

where P is the number of images considered for determining the light field, F is the focal length of the lens, $L_F$ is the value of the light field focused at distance F, $\alpha_j F$ is the focus distance of the image j and $I_j(x)$ is the intensity of the image j, and where [x] denotes the integer closest to x,
   obtaining as a result for each image j, with $1 \leq j \leq P$, the light field $L_F(x)$ evaluated at the value of $u_j$ resulting from the fit, i.e., the view of the light field corresponding to the value $u_j$, where x and u are the two-dimensional vectors determining the position in the sensor and in the lens of the camera, respectively.

7. The method according to claim 6, wherein the value of the light field is determined by solving the system of equations by means of least squares, i.e., minimizing:

$$\|\Sigma_{n=1}^{M} L_F(n+(x-n)/\alpha_j,n) - \alpha_j^2 F^2 I_j(x)\|_2.$$

8. The method according to claim 1, wherein the two images of each selected image pair are taken, respectively, on both sides of the focus.

9. The method according to claim 8, wherein the two images of each selected image pair are taken from symmetrical distances on both sides of the focus.

10. A device for determining the amplitude of the electromagnetic field associated with a scene, the device comprising:
    means for capturing images comprising a lens of focal length F and an image sensor arranged parallel to the lens, at a certain distance from the lens in its image space; and
    processing means configured for carrying out step b) of the method according to claim 1.

11. The device according to claim 10, wherein the processing means are additionally configured for determining the wavefront by the expression:

$$W(x, y) = \sum_{p=0}^{N-1}\sum_{q=0}^{N-1} d_{pq} Z_{pq}(x, y)$$

where $$Z_{pq}(x, y) = \frac{1}{N} e^{\frac{2\pi i}{N}(px+qy)}$$

for each $0 \leq p, q \leq N-1$.

12. The device according to claim 10, wherein the processing means are additionally configured for determining the accumulated wavefront for a plurality of image pairs.

13. The device according to claim 12, wherein the processing means are additionally configured for determining a phase shift between two planes of the object space as the subtraction of the accumulated wavefronts to said planes.

14. The device according to claim 13, wherein the processing means are additionally configured for determining the phase shift for a plurality of object planes.

15. The device according to claim 10, wherein the processing means are additionally configured for:

determining, from P images selected from the plurality of captured images, a value of a light field (L) focused at distance F at M values other than u, M≤P, as the values of the light field verifying the system of equations:

$$\Sigma_{n=1}^{M} L_F(n+[(x-n)/a_j],n) = \alpha_j^2 F^2 I_j(x), \forall j \in \{1 \ldots P\} \wedge \forall x \in \{1 \ldots k\}$$

where P is the number of images considered for determining the light field, F is the focal length of the lens, $L_F$ is the value of the light field focused at distance F, $\alpha_j F$ is the focus distance of the image j and $I_j(x)$ is the intensity of the image j, and where [x] denotes the integer closest to x, and obtaining as a result for each image j, with 1≤j≤P, the light field $L_F(x)$ evaluated at the value of $u_j$ resulting from the fit, i.e., the view of the light field corresponding to the value $u_j$, where x and u are the two-dimensional vectors determining the position in the sensor and in the lens of the camera, respectively.

16. The device according to claim 15, wherein the processing means are additionally configured for determining the value of the light field by solving the system of equations by means of least squares, i.e., minimizing:

$$\|\Sigma_{n=1}^{M} L_F(n+(x-n)/\alpha_j,n) - \alpha_j^2 F^2 I_j(x)\|_2.$$

17. The device according to claim 10, wherein the processing means are additionally configured for taking the two images of each selected image pair, respectively, on both sides of the focus.

18. The device according to claim 17, wherein the processing means are additionally configured for taking the two images of each selected image pair from symmetrical distances on both sides of the focus.

* * * * *